United States Patent [19]

Weisglass et al.

[11] 3,754,824

[45] Aug. 28, 1973

[54] LIGHT COLOR CONTROL APPARATUS

[75] Inventors: Louis L. Weisglass, New York, N.Y.; Robert A. Flieder, Englewood Cliffs, N.J.; Lewis Rubin, Great Neck, N.Y.

[73] Assignee: Berkey Photo, Inc., Woodside, N.Y.

[22] Filed: Dec. 14, 1971

[21] Appl. No.: 207,809

[52] U.S. Cl. .................................. 355/35, 355/71
[51] Int. Cl. ............................................ G03b 27/76
[58] Field of Search ............... 355/32, 35, 36, 38, 355/71

[56] References Cited
UNITED STATES PATENTS

| | | | |
|---|---|---|---|
| 3,077,140 | 2/1963 | Simmon et al. | 355/35 |
| 2,794,365 | 6/1957 | Baasner et al. | 355/35 |
| 3,049,051 | 8/1962 | Debrie | 355/35 X |

*Primary Examiner*—Samuel S. Matthews
*Assistant Examiner*—Richard A. Wintercorn
*Attorney*—Toren & McGeady

[57] ABSTRACT

The disclosed apparatus forms part of the lamp house in a photographic enlarger. Three dichroic filters partially intercept a white light beam emerging from a light source having an elliptical reflector. The filters divide the beam into a white portion and an intensely colored portion. The beam enters a mixing chamber wherein white-opaque side walls and a ceiling coact with each other to mix the white and intensely colored light. The light exits through a diffuser at the bottom of the chamber and passes through a color slide or negative having a color image. An optical system focuses the image on printing paper. Three pivotally mounted filter holders support the filters in their respective positions. Three cams movable by manually adjustable wheels control the positions of the holders. A control arm engageable with all three of the holders simultaneously draws the filter holders out of engagement with the cams until the filters are removed from the beam. A regulating arm moves an attenuator into the path of the beam.

27 Claims, 11 Drawing Figures

Patented Aug. 28, 1973
3,754,824
3 Sheets-Sheet 1
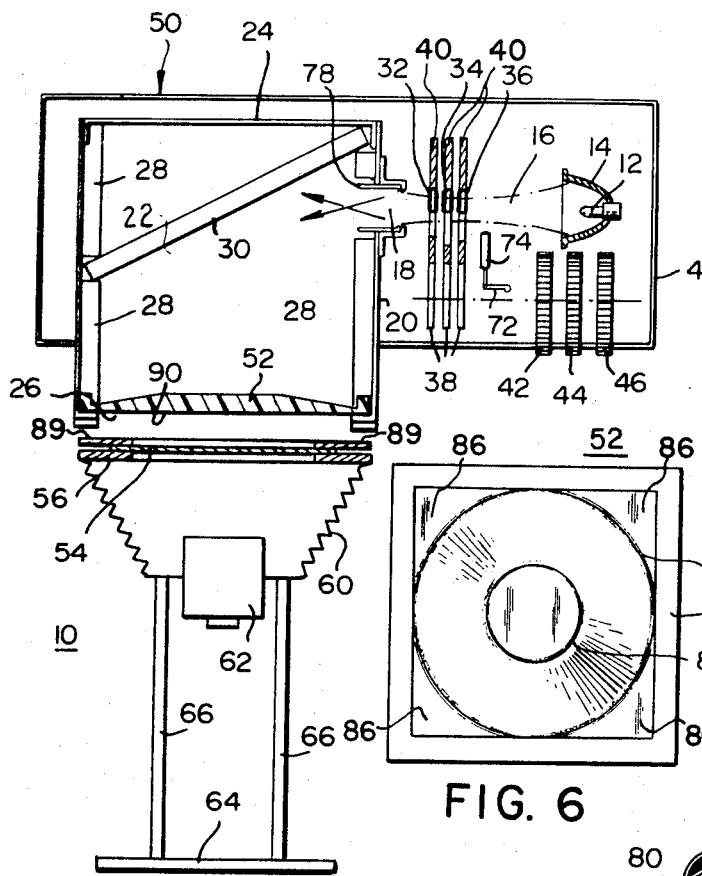
FIG. 1
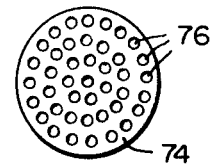
FIG. 3
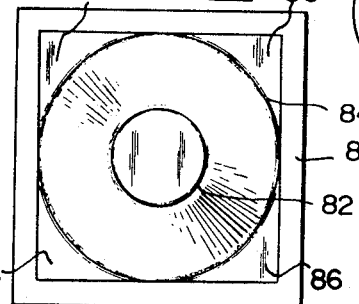
FIG. 6
FIG. 5
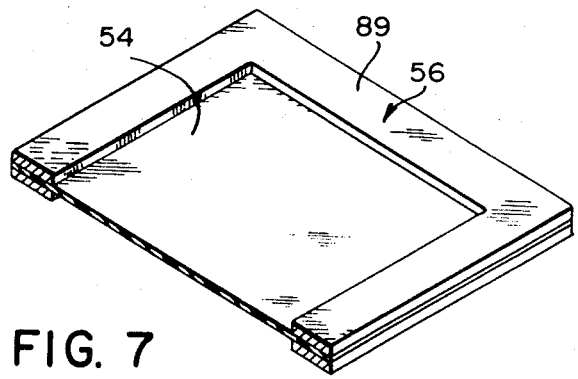
FIG. 7
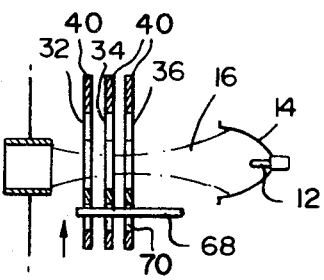
FIG. 2
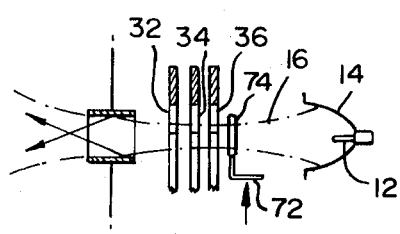
FIG. 4

LIGHT COLOR CONTROL APPARATUS

CROSS-REFERENCES TO RELATED APPLICATIONS

This application is related to the following applications being filed on or about the date of this application. The contents of those applications filed concurrently herewith or before this application are herewith made a part of this application as if fully recited herein. All these applications are assigned to the same assignee as this application:

Application of Louis L. Weisglass entitled "Color Enlarging Apparatus" (Attorney's Docket No. T800);

Application of Louis L. Weisglass and Robert A. Flieder, entitled "Illumination System For Color Enlargers And The Like" (Attorney's Docket No. T801); and Application of Louis L. Weisglass, Robert A. Flieder, and Alfred Simmon, entitled "Light Source For Color Enlargers," (Attorney's Docket No. T799).

This application contains subject matter disclosed in disclosure document No. 006636 dated Sept. 13, 1971.

BACKGROUND OF THE INVENTION

This invention relates to light coloring apparatuses, and particularly to lamp houses for photographic enlargers. The invention also relates to photographic color enlargers.

In photographic color enlargers light is passed through a color film, such as a color negative or color slide, whose image is to be printed, and an optical system focuses the light passed through the film onto color printing paper. It is often necessary to color the light passed through the film to compensate for the color balance of the film, the printing paper, and the original white light source. It is desirable that the light across the film be substantially uniform in intensity, chromaticity, and saturation. It is also desirable that the chromaticity and saturation be accurately adjustable. Furthermore, it is desirable that the light be used as efficiently as possible and that the chromaticity and saturation achieved for one set of circumstances be accurately reproducible at a later time, despite intervening changes.

SUMMARY OF THE INVENTION

According to a feature of these inventions, these needs are achieved by partly intercepting a "white" light beam with three dichroic filters so as to color one part of the beam and mixing the portions of the beam with each other before passing it through the image on the film and focusing it on the printing paper. The degree of intercept by each of the filters is established by supporting the filters in respective holders that are spring biased against respective cams whose degree of rotation is determined by manually movable wheels. Digital counters register the degree of rotation of each cam. Thus, for each combination of chromaticity or color and saturation or density there exists three defining digital numbers. An operator can then return to these numbers to achieve an accurate reproduction of the particular chromaticity and saturation.

According to another feature of the invention, the filter holders each include adjustable means engaging the cams so that the digital counters can be calibrated in advance to conform to the calibration of other comparable enlargers.

These and other features of the invention are pointed out in the claims forming a part of this specification and defining the invention more precisely. Other objects and advantages of the invention will become obvious from the following detailed description when read in light of the accompanying drawings.

BRIEF DESCRIPTION OF THE DRAWINGS

In the drawings:

FIG. 1 is a somewhat schematic elevation of an enlarger embodying features of the invention;

FIG. 2 is a schematic illustration of a portion of FIG. 1 with filters moved out of the path of the light beam;

FIG. 3 is a drawing illustrating an attenuator of the enlarger of FIG. 1;

FIG. 4 is a schematic illustration showing the attenuator of FIG. 3 in the path of the beam of FIG. 4;

FIG. 5 is a perspective view of a cylindrical mirror in FIG. 1;

FIG. 6 is a plan view of a diffusing plate used in FIG. 1;

FIG. 7 is a perspective view of a film carrier forming a part of FIG. 1;

DESCRIPTION OF PREFERRED EMBODIMENTS

Figures 8, 9:
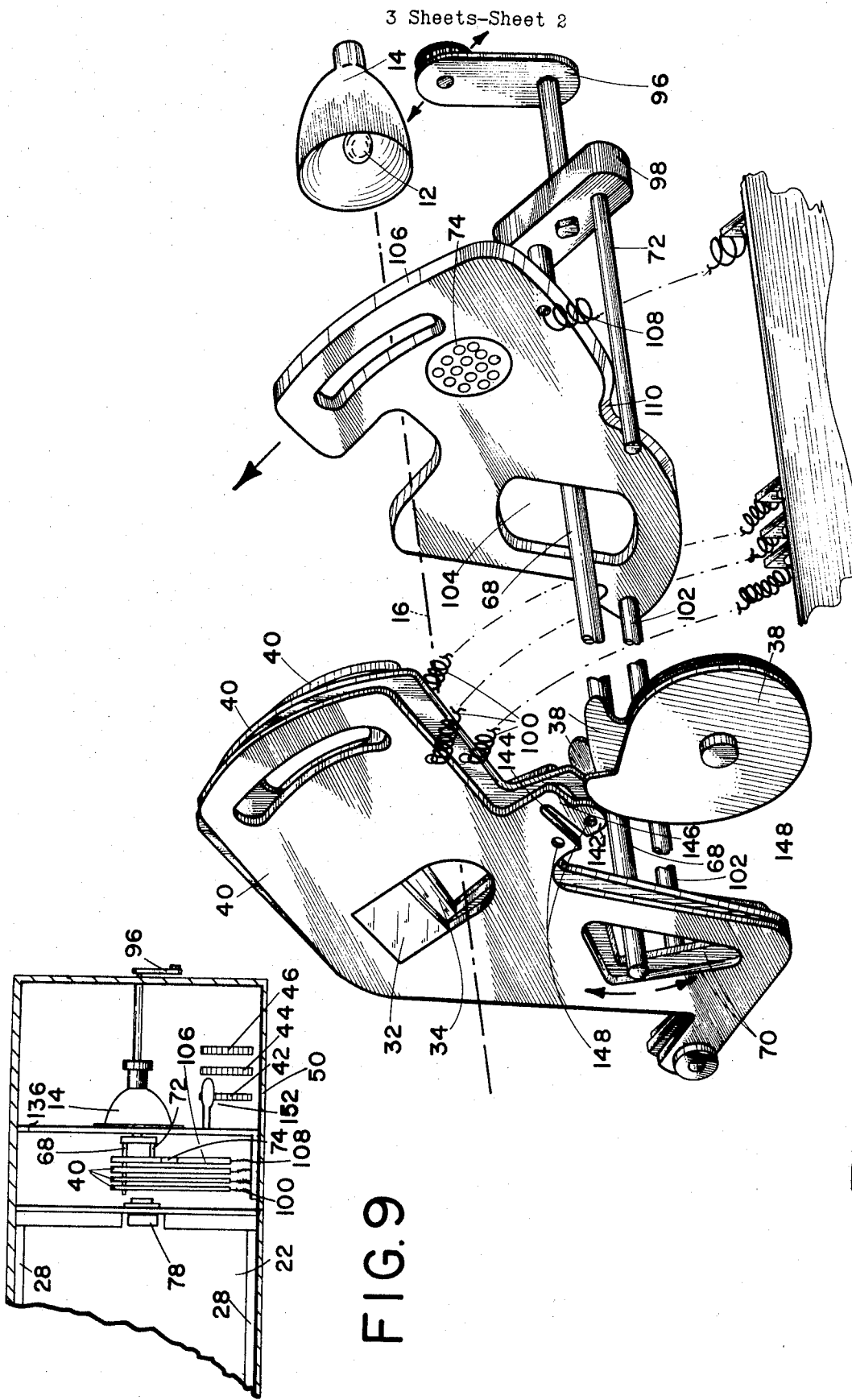
FIG. 8 is an exploded view of a filter control illustrated in FIG. 1.
FIG. 9 is a plan view of the structure of FIG. 8 as it is assembled within its housing.

In the enlarging apparatus 10 of FIG. 1, a light source 12, together with an elliptical reflector 14, directs a light beam toward the entrance port 18 of the front wall 20 in a mixing chamber 22. The mixing chamber is generally composed of a metal shell 24 having an exit opening 26 extending virtually across the bottom. Solid, expanded white foam panels 28 line the front and side walls of the chamber 22 while a ceiling or roof panel 30 extends angularly upward from the end away from the source 12 toward the end closer to the source. The ceiling panel 30 lies in the path of the light beam entering the entrance port 18.

Three dichroic filters 32, 34, and 36 intercept a portion of the beam so as to impart an intense color to the intercepted portion of the beam. The filters 32, 34, and 36 pass the respective subtractive primary colors, cyan, yellow and magenta. Suitable cams move respective filter holders 40 which are each biased against the cams 38 by respective springs. Each holder 40 supports one of the filters 32, 34, and 36 so that each filter intercepts a portion of the beam determined by the rotary position of each cam 38 engaging its holder 40. Each of the filters 32, 34, and 36 may then intercept different portions of the beam 16.

Suitable knurled wheels 42, 44, and 46 extending through the housing 48 of the overall light mixer 50 are each coupled to one of the cams 38. Thus, an operator may set the intercepting portion of the filter 32 by turning the wheel 46 to a particular position. A digital indicator, not shown in FIG. 1, apprises the operator of the extent to which the filter 32 intercepts the beam 16 and the extent to which the wheel 46 has been turned. Similarly, digital indicators indicate the extent to which the filters 34 and 36 enter the beam 16 on the basis of the extent to which the wheels 44 and 42 have been turned. The cams 38 and the wheels 42, 44, and 46 are coaxial with each other and coupled by coaxially surrounding shafts (not shown in FIG. 1).

Within the chamber 22 the opaque ceiling panel 30 composed of white, hardened foam material, partly colored beam in many directions. Together with the remaining panels 28, each of which corresponds to the panel 30, it bounces the light back and forth in many directions. Ultimately, the panels 28 and 30 mix the white portion of the beam with the colored portion so as to achieve the saturation or density depending on the overall degree to which the filters 32, 34, and 36 extend into the beam. The color balance of the resulting beam, the factor often called chromaticity, is determined by the degree to which each filter extends into the beam relative to the other filters.

The dispersed and mixed light leaves the chambers through a translucent opal diffusion or scattering plate 52 in the exit opening 26. This light can then pass through an interchangeable color film 54 mounted in a removable film carrier 56. Light then passes from the transparency, i.e., the negative 54, through adjustable bellows 60 to an adjustable objective 62. The latter focuses the light as modified by the negative upon the printing paper, not shown, mounted on a carrier 64.

Suitable racks 66 support the upper projection portion of the enlarger 10, namely the lamp house, above the paper carrier. In the usual manner, the position of the lamp house of the enlarger is adjustable on the racks 66 by means of pinions for up and down movement. This adjusts the size of the image being focused upon the printing paper in the print carrier 64. The housing 50 can be removed from the enlarger for servicing and adjusting.

An arm 68 passing loosely through the opening 70 of the holders 40 can be operated from outside the housing 50 to withdraw all the filters simultaneously from the positions shown in FIG. 1 where they engage the cams, out of the beam 16, and into the position showns shown in FIG. 2. This allows uncolored light from the source 12 and the reflector 14 to illuminate the film 54. The wheels 42, 44, and 46 can each only move one filter at a time with the cams 38.

Moreover, an arm 72, operable from outside the housing, moves a light attenuator 74, such as shown in FIG. 3, from a position shown in FIG. 1 to the position shown in FIG. 4. The light attenuator is composed of a metal plate having a plurality of substantially evenly distributed light perforations. The perforations pass approximately 25 percent of the light. When moved into the position shown in FIG. 4, the light attenuator reduces the overall intensity of the light beam emerging from the source 12 and the reflector 14 by 75 percent. It thus dims the illumination of the film 54 and the image on the paper in the carrier 64.

The source 12 and the elliptical reflector 14 make the beam converge to a narrow waist and diverge as shown in FIGS. 1,2,4. The filters are located to intercept the beam at the narrow waist, that is,the narrowest portion of the beam. The beam thereafter diverges as it enters the chamber 22. As the diverging light beam 16 passes through the entrance port 18, a cylindrical mirror 78, having an interior reflecting surface, reflects the outer margin of the beam diagonally across the beam. In this way the light from one side of the beam now passes to the other side. Thus, the colored portion of the beam is reflected to the light portion and the light portion toward the colored portion. This improves the mixing process within mixing chamber.

The translucent diffusing plate 52 at the bottom exit 26 tapers outwardly from the thick, circular center 82 toward a thin, circular rim 84 (shown in FIGS. 1 and 6). From the circular rim 84, the material remains thin at the corner margin 86 toward a thickened square, support frame 88. The entire plate is monolithic and composed of a diffusing or scattering material such as an acrylic resin with minute reflective particles in suspension.

The plate produces increased transmission at the edges as compared to the center. It has the effect of compensating for the fall-off in intensity from the center to the edges. This fall-off is normally experienced when using a uniform diffuser. It results from the cosine law fall-off occuring from the center of the light beam toward the edges. The diffusion plate 52 returns the scattered light into the chamber while the remaining light passes through the diffusion plate. This effect, aside from producing uniformity, increases efficiency.

Also raising the efficiency of the system significantly is the carrier 56 which is illustrated in detail in FIG. 7. Here the upper surface 89 of the carrier is either painted white or mirrored. The surface 89 reflects any light emerging from the diffuser back to the diffuser 52 and into the chamber. The bottom surface 90 of the plate 52 has a matte finish. This prevents the plate 52 from rereflecting the upwardly directed light. It allows most of the light to pass from the surface 89 into the mixing chamber 22.

FIGS. 8 and 9 illustrate details of the mechanism which move the filters 32, 34, and 36 in response to the wheels 42, 44, and 46. Here, indexing stops (not shown) allow movement of a lever 96 to three discreet positions. In the central position shown, the lever 96 centers a crossbar 98 so that the arm 68 passes through the opening 70 in the holders 40 and 106 affecting their positions. In this state, three springs 100 bias the holders 40 clockwise about a shaft 102 and against the respective peripheral surfaces of the cams 38. The arm 68 also passes through an opening 104 in a holder 106 for the attenuator 74. Here a spring 108 biases the holder 106 clockwise about the shaft 102.

When the lever 96 is moved upwardly toward its up index position, the crossbar 98 transports the arm 72 upwardly. In its upward rise, the arm 72 engages a ledge 110 in the holder 106 and displaces the latter against the force of the spring 108. The resulting movement ends in the upper indexing position of the lever 96. It locates the attenuator 74 across the beam 16. During this time,the arm 68 travels downwardly in the opening 104 and the opening 70 without engaging the surfaces of the holders 40 or 106.

When an operator moves the lever 96 back to its central position, the spring 108 withdraws the holder 106 and the attenuator 74 from the path of the beam 16.

As the lever 96 is placed in its downward position, the crossbar 98 displaces the arm 68 upwardly. The latter engages the interior surface 112 at the opening 70 and drives the holders 40, simultaneously, away from the cams 38 against the forces of the springs 100. This removes the filters 32, 34, and 36 from the path of the beam 16. Thus, simple means permit the normal color compensating light to be changed to an attenuated or dimmed light,or a "white" light with but a single lever.

Figure 11:
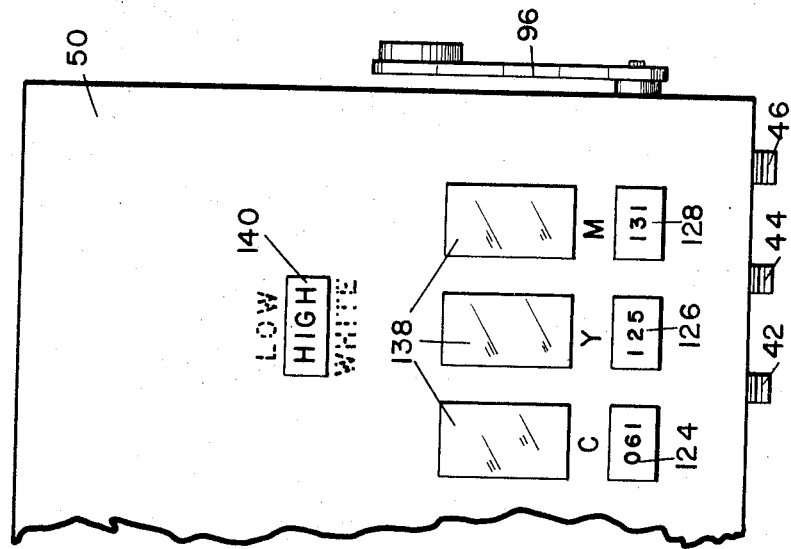
FIG. 11 is an elevation of the cover plate on the part of the housing enclosing the apparatus in FIG. 10.
Figure 10:
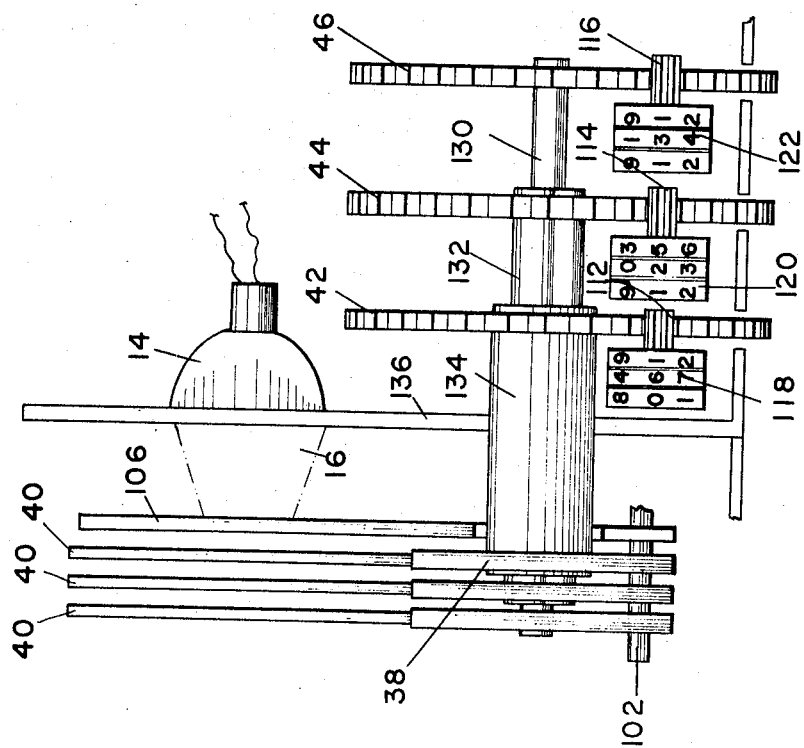
FIG. 10 is a detailed elevation of the filter positioning apparatus in FIG. 1.

The knurling at the peripheries of the wheels 42, 44, and 46 constitute gear teeth as shown in FIGS. 10 and 11. These gear teeth project through openings in the bottom of the housing 50 so that an operator can conveniently turn them. Three spur gears 112, 114, and 116 engaging the teeth at the edges of the respective wheels 42, 44, and 46 operates respective three-digit decimal counters 118, 120, and 122. Three of the digits in each counter project through suitable windows 124, 126, and 128 in the housing 50 as shown in FIG. 11.

A shaft 130 keyed to the wheel 46 couples the rotation of the wheel to the leftmost cam 38. A hollow shaft 132 coaxially surrounding the shaft 130 and keyed to the wheel 44 couples the rotation of the wheel 44 to the center cam 38. A second hollow shaft 134 couples the rotation of the wheel 42 to the rightmost cam 38. A suitable bearing (not shown) supports the shaft in an interior wall 136 upon which the reflector 14 is mounted.

The counter 118 is calibrated so that it reads 000 when the wheel 42 has moved the rightmost cam 38 to the position in which it lifts the holder 40 with the filter 36 furthest agains the force of the spring 100. Under these circumstances the filter 36 would be substantially out of the path of the beam 16. Similarly, 000 indications by the counters 120 and 122 in the windows 126 and 128 are calibrated to denote that the filters 34 and 36 have been moved as far out as possible from the path of the beam 16 by the cams 38 and 40. For displaying the actual colors of the filters, being moved by the wheels 42, 44, and 46 to extents indicated in the windows 124, 126 and 128, the front panels of the housing 50 carries three rectangular color spots 138 corresponding to the colors of the filters 32, 34, and 36. These spots are located directly above the windows 124, 126, and 128 indicating the portion of that color filter. The initials C, Y and M appear between the corresponding spot and window to indicate cyan, yellow and magenta.

The counters 118, 120 and 122 are further calibrated to read 150 when the wheels turn the cams 38 so that the holders are at the "lowest" point on each cam. That is to say, a reading of 150 indicates that the filters intercept as much as the beam 16 as possible, namely, almost all of the beam.

A window 140 displays an indication "HIGH" when the lever 96 is in its central position. This is accomplished by coupling between the lever 96 and a plate behind the window 140. When the lever 96 is pushed into its downward position the word "LOW" appears in the window 140, and "WHITE" appears when the lever is in its downward position.

To assist in the accuracy of the calibration and to ensure consistency in the various models of the same enlarger each of the holders 40 is furnished with a cam follower portion 142 that engages the respective cams 38. An elongated notch 144 in each holder allows adjustment of the position of the filter within the holder relative to the surface of the cam. This adjustment can be accomplished by producing a permanent set in the material 146 at the end of the notch 144 when each enlarger is calibrated during production. Suitable hole 148 may be used to assist in achieving the set.

It will be noted that the filters 32, 34, and 36 in each holder 40 are substantially aligned with the center of the cams 38 and the point of contact of each holder with each cam. This produces a substantially predictable relationship between the cam and the position of the corresponding filter. Moreover, the leading edge of each filter 32, 34, and 36 is substantially perpendicular to its path of travel about the shaft 102. This also lends a degree of predictability of position.

The fact that the wheels 42, 44, and 46 project from the bottom of the housing 50 while the windows 124, 126, and 128 appear on the face of the housing, makes it easy for an operator to operate the wheels while observing the indications.

The housing 50 may assume almost any one of a number of positions with respect to the eye level of the operator, as the lamp house is moved to adjust the printed image. This makes convenience of operation and observation essential.

In operation, a user places the negative 54 in the carrier 56 and then places the carrier in the enlarger. He adjusts the wheels 42, 44, and 46 to compensate for the particular color balance inherent in the particular type of film being used, the type of image on the film, the type of printing paper being used, and the "whiteness" of the lamp 12. This may be done by observation or by referring to a meter. The operator may then copy the particular numbers established so that a corresponding setting can be achieved at a later date. He then focuses the objective and projects the image on the printing paper. After exposure the print is developed.

The invention permits continuously variable color correction in densities from 0 to 150 without the use of supplementary filters. Individual return springs 100 assure positive return action of the filter holders and keep the holders in continuous contact with the operating cams.

The enlarger attenuator permits light sources that effectively produce high printing speeds. The attenuator reduces the high light output without affecting color balance. This eliminates the need for large "neutral density" filters. It also prevents reprocity failure from too short exposure. The lever 96 which causes the attenuator 76 to intercept the beam and dim the light, also allows retraction of all color filtration without changing or zeroing the setting of the wheels 42, 44, and 46. Fast and convenient composition, scaling and focusing is thus possible under full power unfiltered light.

The location of the wheels at the bottom of the lamp house furnishes substantial operator convenience when the enlarger is elevated for large magnification. An auxiliary lamp behind the front panel of the housing illuminates the digital readouts which are substantially color coded by the spots 138. The readouts indicate filtration to 0.01 with absolute precision and insure repeatability. The precise control afforded through the use of digital readouts also permits high filter-control gearings and thus full filtration range from 0 to 150 can be dialed in less than one revolution of the wheel. The auxiliary lamp behind the front panel is designated 152.

It should be noted that the springs 100, which are connected at one end to the holders 40, are secured at the other ends to an extension of the wall 136 in the housing 50.

The mixing chamber 22 constitutes what is sometimes called a light integrator or integrating chamber.

While embodiments of the invention have been described in detail it will be obvious to thoses skilled in the art that the invention may be embodied otherwise without departing from its spirit and scope.

What is claimed is:

1. A color control apparatus, comprising light source means forming a beam, color filter means, holder means supporting said filter means and being movable into positions in which said filter means are held partly in the path of the beam so as partly to intercept the beam and partly color the beam, adjustable cam means, said holder means being engageable with said cam means, said cam means moving said holder means when engaged therewith so as to vary the degree of intercept of said filter means with the beam and thereby the degree of coloration added to the beam, spring means for urging said holder means into engagement with said cam means, and chamber means in the path of the beam for mixing the colored and white portions of the beam, said cam means having a surface defining the limits between which said holder means can be moved by said cam means and between which said filter means can be moved into and out of the beam, said filter means including one homogeneously dense filter of a given color movable into positions in which said filter is held partly in the path of the beam so as partly to intercept the beam and partly color the beam the given color, said filter being moved between the limits by said holder means, said filter alone defining the color density of the given color imparted to the beam and defining the maximum and minimum densities for the given color when positioned at the limits, said filter being continuously adjustable throughout the whole density range of the given color.

2. An apparatus, as in claim 1, wherein said cam means includes manually adjustable wheel means for permitting adjustment of said cam means manually.

3. An apparatus, as in claim 2, further comprising digital indicator means coupled to said wheel means for indicating the degree to which said wheel has been turned.

4. A color control apparatus, comprising light source means forming a beam, color filter means, holder means supporting said filter means and being movable into positions in which said filter means are held partly in the path of the beam so as partly to intercept the beam and partly color the beam, adjustable cam means, said holder means being engageable with said cam means, said cam means moving said holder means when engaged therewith so as to vary the degree of intercept of said filter means with the beam and thereby the degree of coloration added to the beam, spring means for urging said holder means into engagement with said cam means, chamber means in the path of the beam for mixing the colored and white portions of the beam, said cam means including manually adjustable wheel means for permitting adjustment of said cam means manually, said wheel means including a plurality of peripheral gear-like teeth, and digital indicator means having spur gear means engaging said teeth so as to be turned when said wheel means is turned, said indicator means indicating digitally the extent to which said wheel means has been turned, said cam means having a surface defining the limits between which said holder means can be moved by said cam means and between which said filter means can be moved into and out of the beam, said filter means including one homogeneously dense filter of a given color movable into positions in which said filter is held partly in the path of the beam so as partly to intercept the beam and partly color the beam the given color, said filter being moved between the limits by said holder means, said filter alone defining the color density of the given color imparted to the beam and defining the maximum and minimum densities for the given color when positioned at the limits, said filter being continuously adjustable throughout the whole density range of the given color.

5. An apparatus, as in claim 4, wherein said digital indicator means includes a three-decimal indicator coupled to said spur gear means for indicating the degree to which said wheel means has been turned by more than two decimal places.

6. A color control apparatus, comprising light source means forming a beam, color filter means, holder means supporting said filter means and being movable into positions in which said filter means are held partly in the path of the beam so as partly to intercept the beam and partly color the beam, adjustable cam means, said holder means being engageable with said cam means, said cam means moving said holder means when engaged therewith so as to vary the degree of intercept of said filter means with the beam and thereby the degree of coloration added to the beam, spring means for urging said holder means into engagement with said cam means, and chamber means in the path of the beam for mixing the colored and white portions of the beam, said filter means including a plurality of separately adjustable filters, said holder means including a plurality of separate holders mounting said filters and movable so as to move the filters partly in the path of the beam, said cam means including a plurality of adjustable cams each engageable with one of said holder means and moving said holder means when engaged therewith so as to move said filter means to varying positions partly intercepting the beam, said spring means including a plurality of springs each connected to one of said holders for urging said holders into engagement with said cam.

7. An apparatus, as in claim 6, wherein said cam means further includes a plurality of manually adjustable wheels each coupled to one of said cams so as to adjust positions of said cams on the basis of the manually adjusted position of said wheels.

8. An apparatus, as in claim 7, further comprising a plurality of digital indicators each coupled to one of said wheels.

9. An apparatus, as in claim 7, wherein each of said wheels has a plurality of gear-like teeth at the periphery thereof, said digital indicators each having a spur gear engaging the teeth of one of said wheels so as to be turned by one of said wheels.

10. An apparatus, as in claim 9, wherein each of said digital indicators includes three-decimal position rings each coupled to each other and the corresponding spur gear.

11. A color control apparatus, comprising light source means forming a beam, color filter means, holder means supporting said filter means and being movable into positions in which said filter means are held partly in the path of the beam so as partly to intercept the beam and partly color the beam, adjustable cam means, said holder means being engageable with said cam means, said cam means moving said holder means when engaged therewith so as to vary the degree of intercept of said filter means with the beam and thereby the degree of coloration added to the beam, spring means for urging said holder means into engagement with said cam means, chamber means in the path of the beam for mixing the colored and white portions of the beam, said holder means has a control surface, and rod means engageable with said surface for moving said holder means out of engagement with said cam means until said filter means are out of the path of the beam.

12. An apparatus, as in claim 6, wherein said holders each have a control surface, rod means movable from a position out of engagement with said control surfaces into engagement with said control surfaces and to a second position for moving said holders out of engagement with said cams against the force of said spring means until said filters are out of the path of the beam.

13. A color control apparatus, comprising light source means forming a beam, color filter means, holder means supporting said filter means and being movable into positions in which said filter means are held partly in the path of the beam so as partly to intercept the beam and partly color the beam, adjustable cam means, said holder means being engageable with said cam means, said cam means moving said holder means when engaged therewith so as to vary the degree of intercept of said filter means with the beam and thereby the degree of coloration added to the beam, spring means for urging said holder means into engagement with said cam means, chamber means in the path of the beam for mixing the colored and white portions of the beam, second holder means having a light attenuator mounted thereon, said second holder means being movable into the path of the beam, and spring means for biasing said holder means out of the path of the beam.

14. An apparatus, as in claim 13, wherein said filter means includes a plurality of separately adjustable filters, said holder means including a plurality of separate holders mounting said filters and movable so as to move the filters partly in the path of the beam, said cam means including a plurality of adjustable cams engageable with one of said holder means and moving said holder means when engaged therewith so as to move said filter means to varying positions partly intercepting the beam, said spring means including a plurality of springs each connected to one of said holders for urging said holders into engagement with said cam.

15. An apparatus, as in claim 14, wherein said second holder means includes a camming surface, and further comprising rod means engageable with said camming surface for moving said second holder means to said attenuator moves into the path of the beam.

16. An apparatus, as in claim 13, wherein said filter means includes a plurality of separately adjustable filters, said holder means including a plurality of separate holders mounting said filters and movable so as to move the filters partly in the path of the beam, said cam means including a plurality of adjustable cams each engageable with one of said holder means and moving said holder means when engaged therewith so as to move said filter means to varying positions partly intercepting the beam, said spring means including a plurality of springs each connected to one of said holders for urging said holders into engagement with said cam.

17. An apparatus, as in claim 16, wherein said holder means includes a control surface, arm means engageable with said surface for moving said holder means out of engagement with said cam means until said filter means are out of the path of said beam.

18. An apparatus, as in claim 15, wherein said holders each have a control surface, arm means movable from a position out of engagement with said control surfaces into engagement with said control surfaces and beyond to a second position for moving said holders out of engagement with said cam against the force of said springs until said fingers are out of the path of the beam.

19. An apparatus, as in claim 17, further comprising bar means connected to said rod means and said arm means and manually movable into three positions, said rod means and said arm means each being out of engagement with said control surfaces and said camming means in one position, said bar means moving said rod means into the position in which said second holder means is interposed in the path of the beam when said bar means is in the second position, said bar means moving said arm means into the positions wherein said holder means are disengaged from said cam means so said filter means are out of the path of the beam when said bar means is in the third position, said holder means being formed so said rod means and said arm means are disengaged from said holder means when said bar means is in two out of three of its positions.

20. An apparatus, as in claim 18, further comprising bar means connected to said rod means and said arm means, said rod means being manually movable into three conditions, said rod means and said arm means each being out of engagement with said control surfaces and said camming surface in one condition of said bar means, said bar means moving said rod means into the position in which said second holder means interposes said attenuator into the path of the beam when said bar means is in the second position, said bar means moving said arm means into the position wherein said holders are disengaged from said cams so said filters are out the path of the beam when said bar means is in the third condition, said holders being shaped so as to be out of engagement with said arm means when said bar means is in the first condition and in the second condition, said holder means being shaped so as to be out of engagement with said rod means when said bar means is in the second condition and the third condition.

21. An apparatus, as in claim 20, wherein said cam means further includes a plurality of manually adjustable wheels each coupled to one of said cams so as to adjust the positions of said cams on the basis of the manually adjusted position of said wheels.

22. An apparatus, as in claim 20, wherein each of said wheels has a plurality of gear-like teeth at the periphery thereof, said digital indicators each having a spur gear engaging the teeth of one of said wheels so as to be turned by one of said wheels.

23. An apparatus, as in claim 22, wherein each of said digital indicators includes three-decimal position rings each coupled to each other and the corresponding spur gear.

24. An apparatus as in claim 6, wherein said cam means includes mounting means for mounting said cams coaxially, a shaft coaxially connected to one of said cams, a sleeve coaxially surrounding said shaft and coupled to a second of said cams, a first wheel secured to said shaft, and a second wheel coaxial with said first wheel secured to said sleeve, said wheel adjusting the positions of said cams through said shaft and said sleeve.

25. An apparatus as in claim 24, wherein each of said wheels has a plurality of gear-like teeth at the periphery thereof, and a plurality of digital indicators each coupled to one of said wheels, said digital indicators each having a spur gear engaging the teeth of one of said wheels so as to be turned by one of said wheels.

26. An apparatus as in claim 1, wherein said source means focuses the beam between said source means and said chamber means, said filter means being located between said source means and said chamber means.

27. An apparatus as in claim 4, wherein said source means focuses the beam between said source means and said chamber means, said filter means being located between said source means and said chamber means.

* * * * *